US011943571B2

(12) United States Patent
Ben-Ezra et al.

(10) Patent No.: US 11,943,571 B2
(45) Date of Patent: Mar. 26, 2024

(54) OPTICAL SWITCH WITH ALL-OPTICAL MEMORY BUFFER

(71) Applicant: NEWPHOTONICS Ltd., Petach Tikva (IL)

(72) Inventors: Yosef Ben-Ezra, Petach Tikva (IL); Yaniv Ben-Haim, Petach Tikva (IL)

(73) Assignee: NEWPHOTONICS Ltd., Petach Tikva (IL)

( * ) Notice: Subject to any disclaimer, the term of this patent is extended or adjusted under 35 U.S.C. 154(b) by 0 days.

(21) Appl. No.: 17/922,005

(22) PCT Filed: Mar. 27, 2022

(86) PCT No.: PCT/IB2022/052786
§ 371 (c)(1),
(2) Date: Oct. 28, 2022

(87) PCT Pub. No.: WO2022/208271
PCT Pub. Date: Oct. 6, 2022

(65) Prior Publication Data
US 2024/0015420 A1    Jan. 11, 2024

Related U.S. Application Data

(60) Provisional application No. 63/167,082, filed on Mar. 28, 2021.

(51) Int. Cl.
*H04Q 11/00* (2006.01)
*H04J 14/02* (2006.01)

(52) U.S. Cl.
CPC ...... *H04Q 11/0005* (2013.01); *H04J 14/0267* (2013.01); *H04Q 11/0003* (2013.01);
(Continued)

(58) Field of Classification Search
CPC ........... H04Q 11/0003; H04Q 11/0005; H04Q 2011/0007–005; H04Q 2011/0073; H04Q 2213/31; H04J 14/0267
(Continued)

(56) References Cited

U.S. PATENT DOCUMENTS 5,345,521 A    9/1994  McDonald et al.
6,636,318 B2 * 10/2003  Sarathy ................ H04B 10/299
                                                    356/477
(Continued)

FOREIGN PATENT DOCUMENTS

CA    2425263 C  * 12/2008  ........... H04B 10/299
JP    4849627 B2    1/2012

OTHER PUBLICATIONS

International Search Report and Written Opinion in related PCT application PCT/IB2022/052786, dated Mar. 27, 2022.
(Continued)

*Primary Examiner* — Li Liu
(74) *Attorney, Agent, or Firm* — Nathan & Associates; Menachem Nathan

(57) ABSTRACT

Consistent with some disclosed embodiments, an optical switch includes: a scheduler; and a buffer for buffering an optical packet including, arranged in a circuit, a clock generator for generating a clock signal, an optical unbalanced Mach Zehnder Interferometer (MZI) and a fiber delay line (FDL) having an FDL length, wherein the optical packet has an optical packet signal, wherein the scheduler is configured to insert the optical packet into the buffer and to determine a number of circulations of the optical packet through the circuit, wherein the MZI modulates the clock signal based on the optical packet signal to create a reshaped optical packet after each circulation of the optical packet through the circuit, and wherein the FDL introduces a delay in the optical packet proportional to the FDL length.

30 Claims, 8 Drawing Sheets

(52) U.S. Cl.
CPC .. *H04Q 2011/002* (2013.01); *H04Q 2011/005* (2013.01); *H04Q 2011/0073* (2013.01); *H04Q 2213/31* (2013.01)

(58) Field of Classification Search
USPC .................................................... 398/45–47
See application file for complete search history.

(56) References Cited

U.S. PATENT DOCUMENTS

| | | | |
|---|---|---|---|
| 7,499,650 B2 * | 3/2009 | Wang ................ | H04Q 11/0005 398/56 |
| 2002/0118419 A1 | 8/2002 | Zheng et al. | |
| 2004/0208544 A1 * | 10/2004 | Ovadia .............. | H04Q 11/0066 398/47 |
| 2006/0203324 A1 | 9/2006 | Harris et al. | |
| 2007/0098404 A1 * | 5/2007 | Wada ................... | H04L 45/502 398/57 |
| 2007/0206619 A1 | 9/2007 | Bjornstad | |
| 2008/0165366 A1 | 7/2008 | Schmitt | |
| 2012/0293856 A1 * | 11/2012 | Onaka .................. | H01S 3/1001 359/276 |

OTHER PUBLICATIONS

Beheshti et al. "Packet scheduling in optical FIFO buffers." 2007 High-Speed Networks Workshop. IEEE, 2007. May 11, 2007.

Liew et al . . . "Scheduling algorithms for shared fiber-delay-line optical packet switches-part i: The single-stage case." Journal of lightwave technology 23.4 (2005): 1586. Apr. 25, 2005.

* cited by examiner

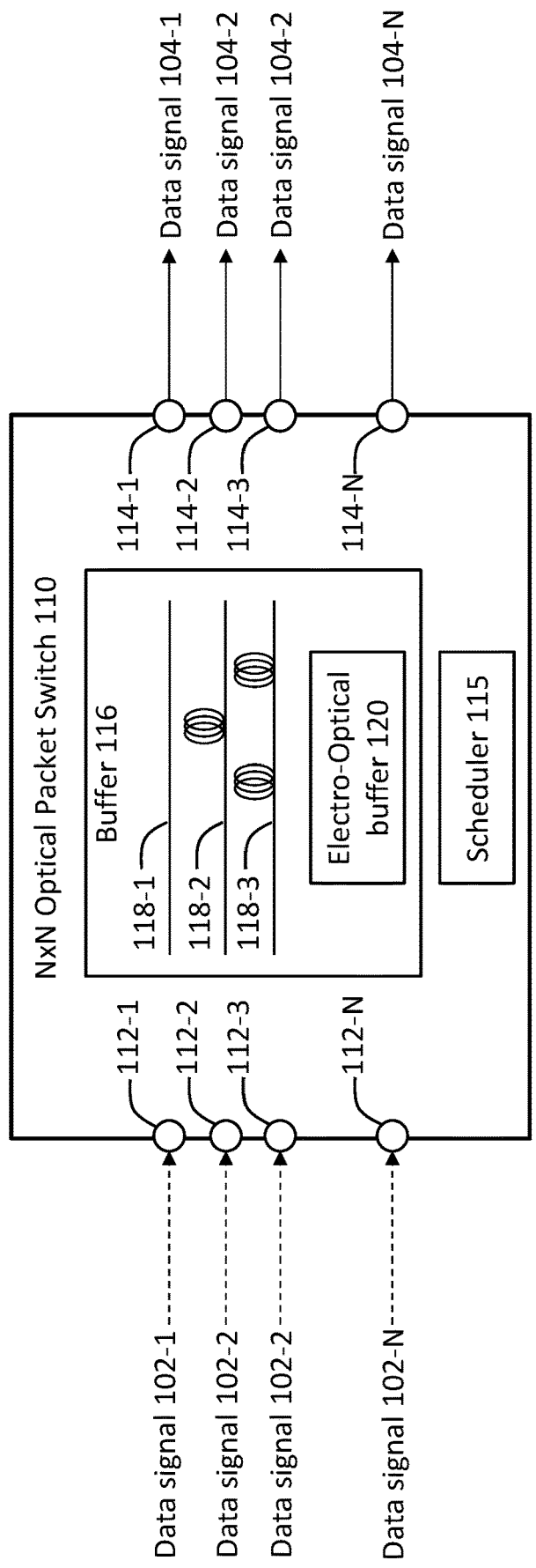
FIG. 1 (Known Art)

OPTICAL SWITCH WITH ALL-OPTICAL MEMORY BUFFER

CROSS REFERENCE TO RELATED APPLICATIONS

This is a 371 application from international patent application No. PCT/IB2022/052786, which claims priority to U.S. provisional patent application No. 63/167,082 filed Mar. 28, 2021, and which is incorporated herein by reference in its entirety.

FIELD

Embodiments of various systems disclosed herein relate in general to optical switches and more specifically to optical switches with all-optical memory buffers.

BACKGROUND

Data centers make use of optical communications and more specifically of optical packet switches for routing optical signals between communication devices. During periods of high load, optical packets may be discarded or may be lost as a result of contention or collisions. To prevent packet loss, some optical switches may include a buffer.

For example, as shown in FIG. 1, a N×N optical packet switch 110 includes N input ports 112-1 ... 112-N, and N output ports 114-1 ... 114N. Input data signals 102 may feed optical data packets into input ports 112 and these optical data packets may be routed to one of output ports 114 to be output as output data signals 104-1 ... 104-N. It should be appreciated that although optical switch 110 includes N input ports 112 and N output ports 114, not all of the input ports 112 and output ports 114 are connected to other communication devices. Switch 110 typically includes a scheduler 115 for directing of data packets within switch 110. Switch 110 may also provide for wavelength conversion of packets between input ports 112 and output ports 114.

Packets may be directed by scheduler 115 into a buffer 116 to slow the throughput of a packet in order to prevent discarding of packets or packet loss due to contention. Buffer 116 may include one or more fiber delay lines (FDL) 118-1 ... 118-N. FDL 118 may take the form of a coil of fiber optic cable that may typically have a length of one kilometer or more. The travel time of a packet through FDL 118 introduces the desired delay/buffering of the packet. As shown, FDLs 118-1, 118-2 and 118-3 are progressively longer so that a packet may be directed through longer FDLs 118 to further delay the packet. In some implementations, a packet may be circulated through an FDL 118 several times. Additionally or alternatively, buffer 116 may include an electro-optical (EO) buffer 120. EO buffer 120 converts the optical packet into an electrical data packet that can then be buffered using electrical memory. Once the buffer period is complete, the electrical data packet is converted back into an optical packet for routing to an output port 114.

These known buffer systems may suffer from several limitations. FDLs may introduce dispersion and signal loss that are increased when multiple circulations of the FDL are used. Use of amplifiers to overcome the signal losses may result in increased noise. Further, FDLs have a fixed length that can only "hold" the packet for the time taken to travel through the FDL, requiring multiple FDLs or multiple circulations through the FDLs to cater for multiple desired buffer periods.

Electro-optical buffers may increase power consumption and introduce delay. Further, these devices may be complex resulting in greater chance of component failure.

It would therefore be desirable to provide optical switch systems featuring buffer mechanisms without introducing significant losses, dispersion, and noise.

SUMMARY

Embodiments disclosed herein relate to systems, devices and methods that enable high data rate optical packet switches with all-optical packet buffering. An all-optical buffer as disclosed herein may significantly improve buffering and flow control in an optical switch used for in high performance computing, such as in data center architectures including spine-leaf, torus, Clos network, etc. An all-optical buffer as disclosed herein may improve packet throughput and routing flexibility, reduce latency, and reduce power consumption.

In order to provide an all-optical packet switch buffer, a presently described system may use a combination of an all-optical unbalanced Mach Zehnder Interferometer (MZI) acting as an optical logical AND gate, a fiber delay line, an SOA for loss compensation, and optical dispersion compensation. The arrangement, as described further below, enables circulation of a buffered packet multiple times through the buffer with reshaping and regeneration of the packet on each circulation. The all-optical buffer as disclosed herein thus may overcome the limitations of current buffer solutions to prevent discarding of packets, packet loss, and contention by enabling extended packet buffering while overcoming loss and dispersion issues as well as avoiding the use of electro-optical buffers.

Advantageously, the buffer may also provide wavelength conversion such that additional wavelength conversion components may not be required in the switch. Further, dispersion management may also be handled optically in the buffer to compensate for dispersion introduced by the FDL. Use of optical dispersion management may reduce the computational complexity of the solution. In some embodiments, the buffer as described herein may utilize integrated WDM for buffering of multiple packets simultaneously over a single FDL. In some embodiments, the all-optical packet switch may be provided using integrated circuits (ICs) on shared semiconductor substrates to further reduce power and size requirements.

Consistent with some disclosed embodiments, an optical switch includes: a scheduler; and a buffer for buffering an optical packet including, arranged in a circuit, a clock generator for generating a clock signal, an optical unbalanced Mach Zehnder Interferometer (MZI) and a fiber delay line (FDL) having an FDL length, wherein the optical packet has an optical packet signal, wherein the scheduler is configured to insert the optical packet into the buffer and to determine a number of circulations of the optical packet through the circuit, wherein the MZI modulates the clock signal based on the optical packet signal to create a reshaped optical packet after each circulation of the optical packet through the circuit, and wherein the FDL introduces a delay in the optical packet proportional to the FDL length.

In some embodiments, the circuit further includes a circuit semiconductor optical amplifier (SOA) to compensate for losses introduced in the FDL. In some embodiments, the circuit further includes an optical dispersion management (DM) module to compensate for dispersion introduced in the FDL.

In some embodiments, the clock generator includes a tunable laser and an electro-optical (EO) modulator configured for modulating a laser output of the tunable laser based on the clock signal.

In some embodiments, the switch further includes a WDM multiplexer and WDM demultiplexer for sharing the FDL therewith between multiple buffers.

In some embodiments, the FDL is one of a single core fiber optic cable or a multi-core fiber optic cable. In some embodiments, the reshaped optical packet is a wavelength converted optical packet. In some embodiments, the MZI includes a pair of MZI SOAs. In some embodiments, the MZI SOAs are quantum dot SOAs.

In some embodiments, the buffer further includes an optical packet splitter for directing the optical packet through the pair of the MZI SOAs, wherein the optical packet splitter splits a signal strength unequally between the pair of MZI SOAs. In some embodiments, the clock and optical packet are fed into each of the pair of MZI SOAs in counter-propagating directions for causing cross gain modulation (XGM) and cross phase modulation (XPM) of the clock signal and of the optical packet signal.

In some embodiments, the switch further includes an exit SOA at an exit of the buffer, and the scheduler is further configured to activate the exit SOA to release the optical packet from the buffer. In some embodiments, the clock generator includes a tunable laser, and wherein the scheduler is further configured for powering down the exit SOA and the tunable laser following release of the optical packet to thereby empty the buffer. In some embodiments, the scheduler is further configured to time the activation of the exit SOA such that it coincides with an nT time period, where n is an integer and T is a optical packet circulation time through the buffer, such that the optical packet is released through the exit SOA from a beginning to an end of the buffered optical packet, and such that release of a partial optical packet through the exit SOA is prevented.

In some embodiments, the released optical packet is a wavelength converted optical packet.

Consistent with some disclosed embodiments, a method for optical buffering of an optical packet having an optical packet signal includes: providing an optical switch including a scheduler and a buffer, wherein the buffer includes a clock generator for generating a clock signal, an optical unbalanced Mach Zehnder Interferometer (MZI) and a fiber delay line (FDL) having an FDL length, arranged in a circuit; configuring the scheduler to insert a optical packet into the buffer and to determine a number of circulations of the optical packet through the circuit; using the MZI to modulate the clock signal based on the optical packet signal to create a reshaped optical packet after each circulation of the optical packet through the circuit; and using the FDL to introduce a delay in the optical packet proportional to the FDL length.

In some embodiments, the circuit further includes a circuit semiconductor optical amplifier (SOA) to compensate for losses introduced in the FDL. In some embodiments, the circuit further includes an optical dispersion management (DM) module to compensate for dispersion introduced in the FDL. In some embodiments, the clock generator includes a tunable laser and an electro-optical (EO) modulator configured for modulating the laser output of the tunable laser based on the clock signal.

In some embodiments, the method further includes providing a WDM multiplexer and WDM demultiplexer for sharing the FDL therewith between multiple buffers. In some embodiments, the FDL is one of a single core fiber optic cable or a multi-core fiber optic cable. In some embodiments, the reshaped optical packet is a wavelength converted optical packet.

In some embodiments, the MZI includes a pair of MZI SOAs. In some embodiments, the MZI SOAs are quantum dot SOAs. In some embodiments, the buffer further includes a optical packet splitter for directing the optical packet through the pair of MZI SOAs, wherein the optical packet splitter splits a signal strength unequally between the pair of MZI SOAs.

In some embodiments, the clock and optical packet are fed into each of the pair of MZI SOAs in counter-propagating directions for causing cross gain modulation (XGM) and cross phase modulation (XPM) of the clock signal and of the optical packet signal. In some embodiments, the optical switch includes an exit SOA at an exit of the buffer, and the scheduler is further configured to activate the exit SOA to release the optical packet from the buffer. In some embodiments, the clock generator includes a tunable laser, and the scheduler is further configured for powering down the exit SOA and the tunable laser following release of the optical packet to thereby empty the buffer.

In some embodiments, the scheduler is further configured to time the activation of the exit SOA such that it coincides with an nT time period, where n is an integer and T is a optical packet circulation time through the buffer, such that the optical packet is released through the exit SOA from a beginning to an end of the optical packet, and such that release of a partial optical packet through the exit SOA is prevented. In some embodiments, the released optical packet is a wavelength converted optical packet.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Aspects, embodiments, and features disclosed herein will become apparent from the following detailed description when considered in conjunction with the accompanying drawings. In the drawings and descriptions set forth, identical reference numerals indicate those components that are common to different embodiments or configurations:

FIG. 1 shows a block diagrams of an optical packet switch;

DETAILED DESCRIPTION

Embodiments disclosed herein relate to systems, devices and methods that enable high data rate optical packet switches with all-optical packet buffering.

Figure 2A:
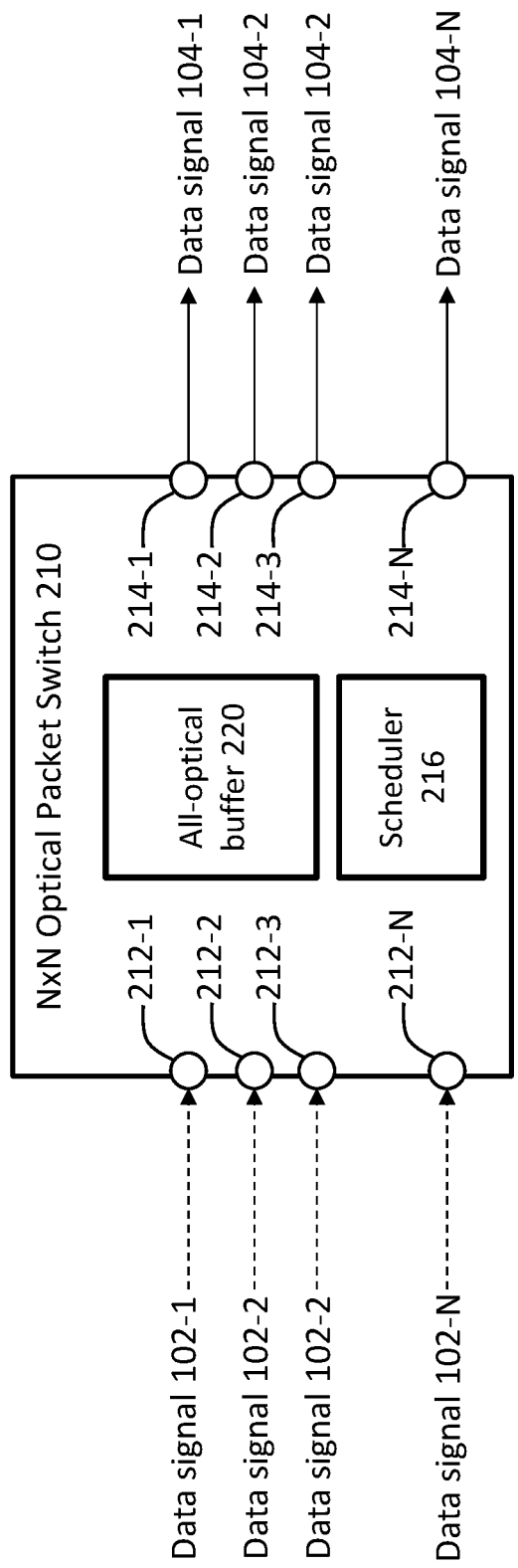
FIGS. 2A-2B show block diagrams of an optical packet switch according to some embodiments.
Figure 2B:
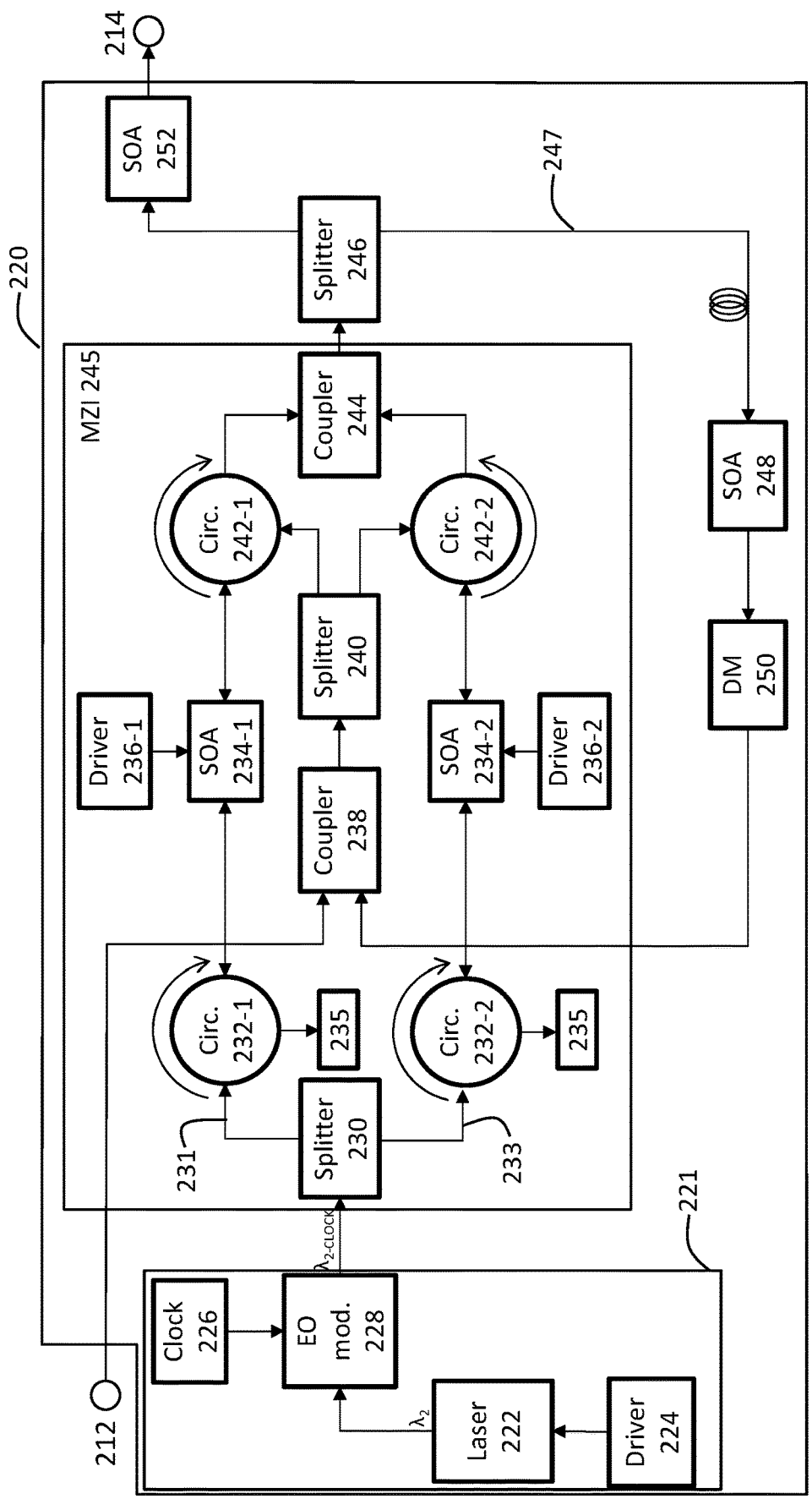

FIGS. 2A-2B show an all-optical packet switch according to some embodiments. As shown in FIG. 2A a N×N optical packet switch 210 may include N input ports 212-1 . . . 212-N and N output ports 214-1 . . . 214N. Input data signals 102 may feed optical data packets into input ports 212 and these optical data packets may be routed to one of output ports 214 to be output as output data signals 104. Data signals 102, 104 are packet-based optical data signals. It should be appreciated that although optical switch 210 includes N input ports 212 and N output ports 214, not all of the input ports 212 and output ports 214 are connected to other communication devices. Switch 110 includes a scheduler 216 for directing of data packets within switch 210.

Packets may be directed by scheduler 216 into a buffer 220 to slow the throughput of a packet in order to prevent discarding of packets or packet loss due to contention. Scheduler 216 is a computing device as defined herein. Scheduler 216 is in data communication with the components of buffer 220 as described further below.

In some embodiments, the components of optical packet switch 210 may be provided as an integrated circuit (IC) on a shared semiconductor substrate. It should be appreciated that other switch internal components aside from scheduler 216 and buffer 220 may be required for the operation of switch 210 but these are not shown in the figures in order to reduce the complexity of the figures. The components of buffer 220 are described in more detail with reference to FIG. 2B and may include a clock generator 221, an optical unbalanced Mach Zehnder Interferometer (MZI) 245 and an FDL 247 configured in a circuit arrangement. The components 221, 245, and 247 of buffer 220 as described below are exemplary implementations and other implementations may be contemplated. In some embodiments, the components of buffer 220 may be formed on a common semiconductor as an IC.

In clock generator 221, a tunable continuous wave (CW) laser 222 may provide a source laser signal (herein designated $\lambda_2$) that may be modulated by an EO modulator 228 based on the signal from a clock 226 to form an optical clock signal (herein designated $\lambda_{2\ CLOCK}$). The wavelength of laser 222 may be chosen by scheduler 216 according to the output port wavelength required for switching purposes as described further below. The period of clock 226 may be substantially the same as the data rate of signals 102. A driver 224 may provide power to CW laser 222.

The optical clock signal from clock generator 221 may be fed into an unbalanced Mach Zehnder Interferometer (MZI) 245 acting as an optical logical AND gate as described, for example, in Singh, Pallavi, et al. "All-Optical Logic Gates: Designs, Classification, and Comparison." Advances in Optical Technologies (2014), hereby incorporated by reference. Within MZI 245, the optical clock signal may be split by a splitter 230 into an upper branch 231 and a lower branch 233. The splitting ratio of splitter 230 into upper branch 231 and lower branch 233 may be controlled by scheduler 216 to optimize the functionality of buffer 220. Non-limiting examples of split ratios include 50/50, 90/10 and 80/20. In some implementations, a clock generator 221 may be implemented using a tunable pulsed laser (not shown).

In MZI 245, the outputs of splitter 230 may be connected to circulators 232-1 and 232-2.

Figure 2C:
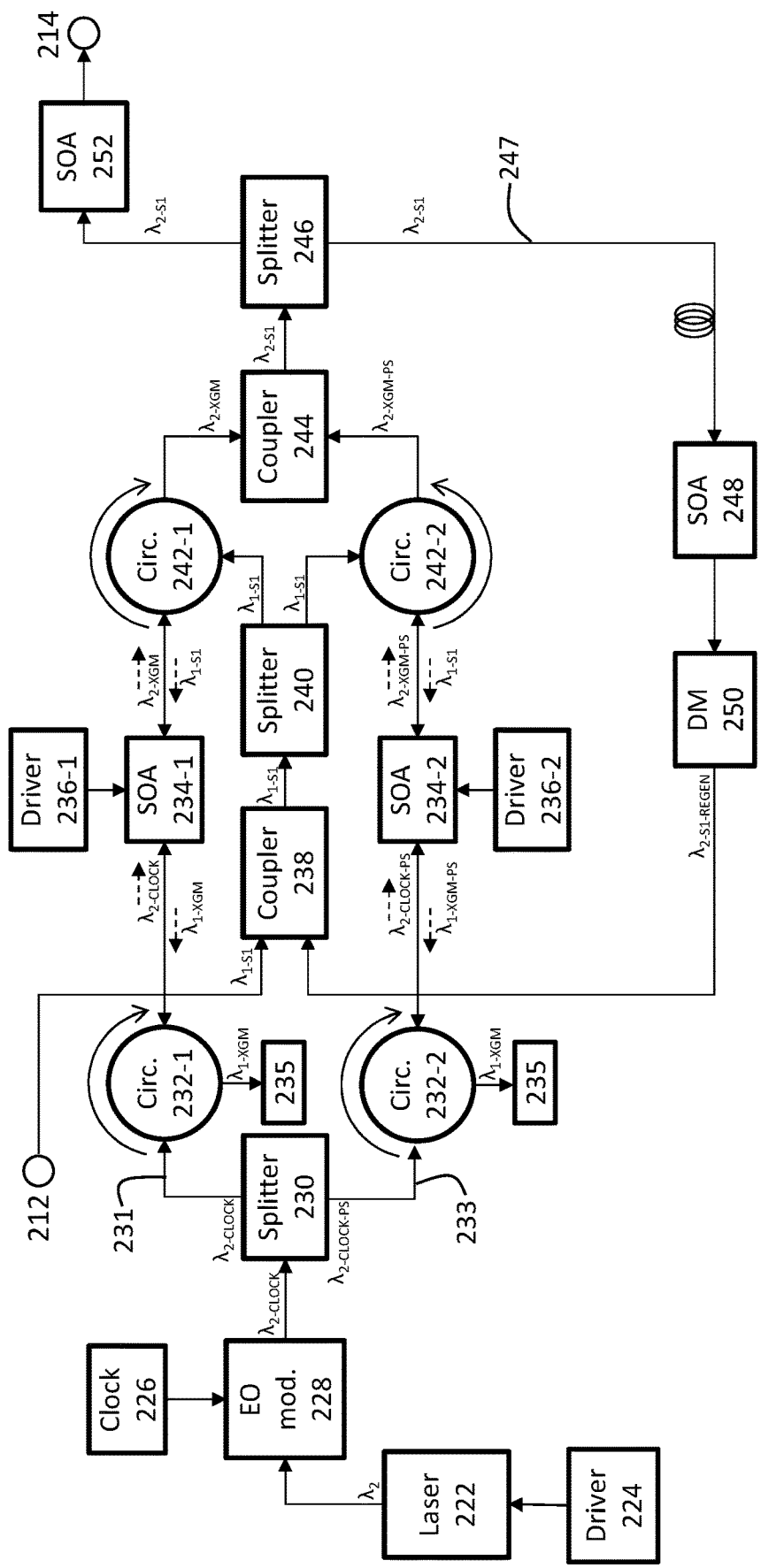
FIGS. 2C-2D shows operation of an optical packet switch according to some embodiments.
Figure 2D:
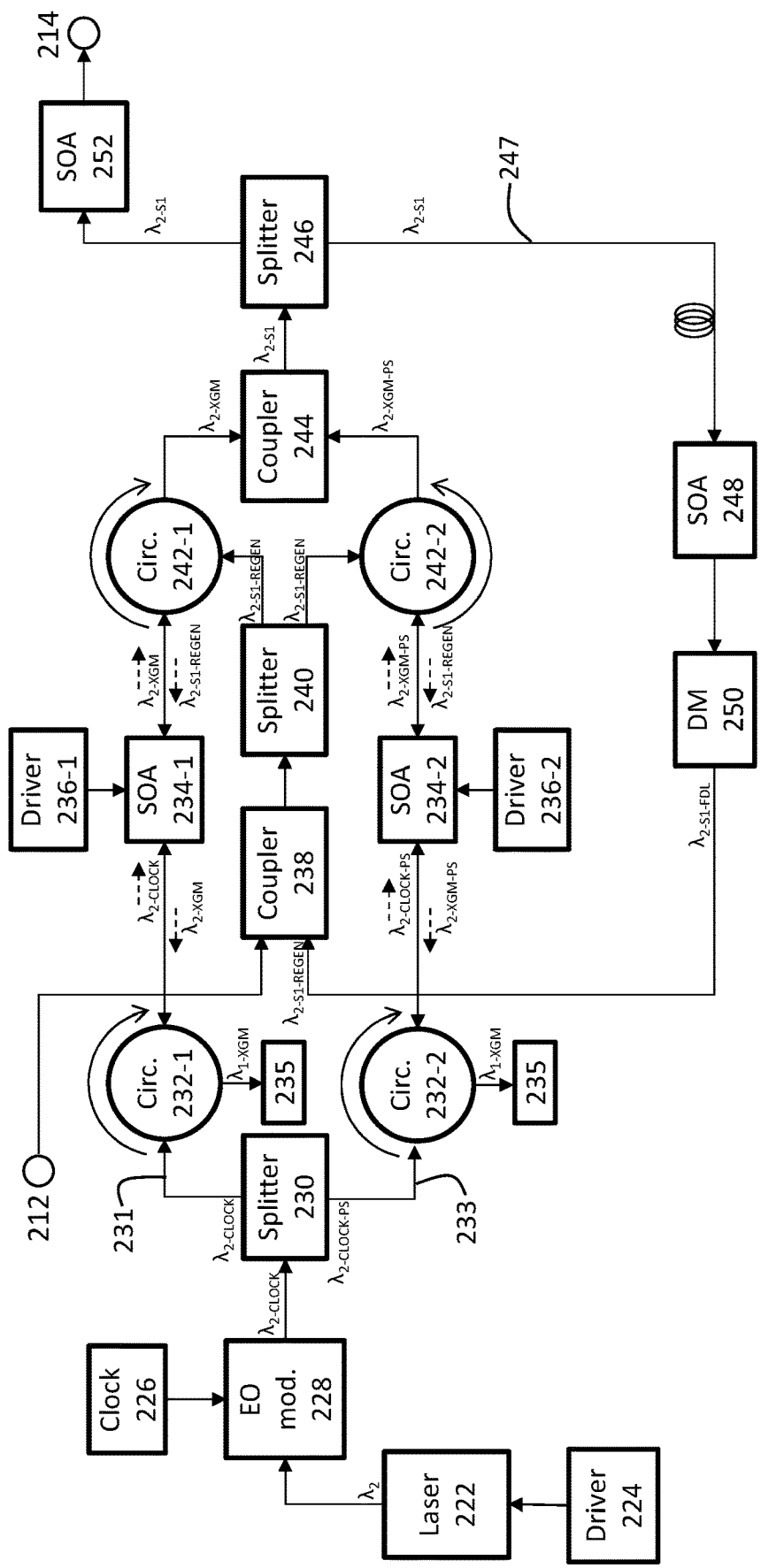

Circulators 232-1 and 232-2 may in turn be connected to, respectively, semiconductor optical amplifiers (SOAs) 234-1 and 234-2. In FIGS. 2B-2D, the circulators are shown as having a clockwise or anticlockwise direction, but it should be appreciated that the direction employed will be functional. SOAs 234-1 and 234-2 may be respectively provided with power by, respectively, drivers 236-1 and 236-2. In some embodiments, SOAs 234-1 and 234-2 may be quantum dot SOAs.

An input packet (herein designated $\lambda_{1-S1}$) to be buffered is provided from a port 212 that may be in communication with MZI 245 at coupler 238. Coupler 238 may be connected to a splitter 240. The output of splitter 240 may be connected to circulators 242-1 and 242-2. The splitting ratio of splitter 240 may be controlled by scheduler 216 in order to optimize the functionality of buffer 220. Non-limiting examples of split ratios include 50/50, 90/10 and 80/20. Circulators 242 may include ports connected to SOAs 234 and to a coupler 244. Coupler 244 may combine the signals from circulators 242.

The output of MZI 245 at coupler 244 may be connected to a splitter 246. Splitter 246 may be connected to SOA 252 and FDL 247. SOA 252 may be connected to one of output ports 214.

In some embodiments, MZI 245 may be implemented using a co-propagating scheme including tunable filters (not shown). In some embodiments, MZI 245 may be replaced with an ultra-nonlinear interferometer (UNI) configuration (not shown). In some embodiments, MZI 245 may be replaced with Sagnac interferometer (SI) gates.

The length of FDL 247 substantially determines the delay introduced by a single circulation of a packet through FDL 247 in buffer 220 and hence determines the optical buffer memory size. As a non-limiting example, an FDL of 1 km will introduce a delay of approximately 5 µs. For a data rate of 100 Gbps, such a delay translates to an approximate optical buffer memory size of 0.5 Mbit.

The output of FDL 247 may be connected to an SOA 248. The output of SOA 248 may be connected to an optical dispersion management (DM) module 250. DM 250 may correct for dispersion management introduced by FDL 247. In some embodiments, DM 250 may include chirped Bragg gratings controlled by a temperature controller (not shown). The output of DM 250 may be connected to coupler 238.

In buffer 220, scheduler 216 may monitor and control all components and provide for automatic adjustment of adjustable components such as laser 222, SOA 234-1, SOA 234-2, SOA 248, DM 250, drivers 224, 236 and SOA 252. Scheduler 216 may be configured to ensure the synchronization of the clock signal and optical packet to be buffered.

The signal path within buffer 220 is illustrated in FIGS. 2C and 2D. In use, as shown in FIG. 2C, an optical clock signal at a second wavelength (herein designated $\lambda_{2\ CLOCK}$) may be fed into MZI 245 at splitter 230. Splitter 230 may introduce a phase shift of π/2 into the clock signal such that upper branch 231 carries the original clock signal $\lambda_{2\ CLOCK}$ while lower branch 233 carries the phase shifted clock signal (herein designated $\lambda_{2\ CLOCK-PS}$) or vice versa. The clock signals $\lambda_{2\ CLOCK}$ and $\lambda_{2\ CLOCK-PS}$ may pass through circulators 232-1 and 232-2 into SOAs 234-1 and 234-2 respectively.

An input optical data packet at a first wavelength (also referred to herein as a data signal and herein designated $\lambda_{1-S1}$) to be buffered may be provided from port 212 to MZI 245 at coupler 238. Scheduler 216 directs packet $\lambda_{1-S1}$ into buffer 220 for a period determined by scheduler 216 before the buffered packet is released from buffer 220 to an output port 214. Since the output port 214 may operate at a different wavelength to the input port, switch 210 may provide for wavelength conversion as part of the buffering process. The wavelength chosen by scheduler for tunable laser 222 may be the wavelength of the destination output port 214.

Packet $\lambda_{1-S1}$ may then be directed by splitter 240 towards both of circulators 242-1 and 242-2. In some embodiments, splitter 240 may split the signal strength unequally between the two branches to thereby unbalance MZI 245. Non-limiting examples of split ratios include 90/10 and 80/20.

Circulators 242 may direct packet $\lambda_{1-S1}$ into SOAs 234 in a counter-propagating direction to that of $\lambda_{2\ CLOCK}$ and $\lambda_{2\ CLOCK-PS}$. The interaction of data packets $\lambda_{1-S1}$ with the clock signals to $\lambda_{2\_CLOCK}$ and $\lambda_{2\_CLOCK\text{-}PS}$ may result in cross-gain and cross phase modulation (XGM, XPM) of the clock signals with the packet signals resulting, in SOA 234-1, in a modulated clock signal (herein designated $\lambda_{2\text{-}XGM}$ and, in SOA 234-2, in a phase shifted modulated clock signal (herein designated $\lambda_{2\text{-}XGM\text{-}PS}$). It should be appreciated that each XGM clock $\lambda_{2\text{-}XGM}$ and $\lambda_{2\text{-}XGM\text{-}PS}$ is essentially a partially reshaped wavelength-converted data packet. Similarly, in the counter-propagating direction, data packets may be modulated via XGM and XPM with the clock signals resulting in $\lambda_{1\text{-}XGM}$ and $\lambda_{1\text{-}XGM\text{-}PS}$. The counter-propagating modulated data packets $\lambda_{1\text{-}XGM}$ and $\lambda_{1\text{-}XGM\text{-}PS}$ may be directed by circulators 232 into terminators 235.

The modulated clock signals $\lambda_{2\text{-}XGM}$ and $\lambda_{2\text{-}XGM\text{-}PS}$ may be combined in coupler 244 to form a reshaped, wavelength converted output packet, herein designated $\lambda_{2\text{-}S1}$. Coupler 244 may introduce a further phase shift of $\pi/2$ into $\lambda_{2\text{-}XGM\text{-}PS}$ for a complete phase shift of $\pi$ in order to provide the required logical AND at the output (coupler 244) of MZI 245. The reshaped, wavelength converted output packet $\lambda_{2\text{-}S1}$ of coupler 244 may be directed by splitter 246 to SOA 252 and FDL 247. When scheduler 216 determines that output packet $\lambda_{2\text{-}S1}$ has completed a required buffering period, scheduler 216 may power on SOA 252 to thereby "release" packet $\lambda_{2\text{-}S1}$ to one of connected output ports 214. It should be appreciated that scheduler 216 may time the opening (powering on) of SOA 252 such that it coincides with an nT time period, where n is integer and T is the packet circulation time through buffer 220, such that a buffered packet may be released through SOA 252 from the beginning to the end of buffered packet, and such that release of a partial packet through SOA 252 may be prevented. Once a packet has been released from buffer 220, laser 222 and SOA 248 may be powered off by scheduler 216 in order to "empty" buffer 220.

Packet $\lambda_{2\text{-}S1}$ traverses FDL 247 until SOA 248. SOA 248 may amplify the signal after FDL 247 to compensate for signal losses incurred in FDL 247. The amplified signal may further be passed through DM 250 to compensate for dispersion introduced by FDL 247.

As shown in FIG. 2D, the output signal from DM 250, herein designated $\lambda_{2\text{-}S1\text{-}REGEN}$, may be reintroduced into MZI 245 at coupler 238. Packet $\lambda_{2\text{-}S1\text{-}REGEN}$ may then be directed by splitter 240 towards both of circulators 242-1 and 242-2. In some embodiments, splitter 240 may split the signal strength unequally between the two branches to thereby unbalance MZI 245. Non-limiting examples of split ratios include 90/10 and 80/20.

Circulators 242 may direct packet $\lambda_{2\text{-}S1\text{-}REGEN}$ into SOAs 234 in a counter-propagating direction to that of $\lambda_{2\_CLOCK}$ and $\lambda_{2\_CLOCK\text{-}PS}$. The interaction of data packets $\lambda_{2\text{-}S1\text{-}REGEN}$ with the clock signals to $\lambda_{2\_CLOCK}$ and $\lambda_{2\_CLOCK\text{-}PS}$ may result in XGM and XPM of the clock signals with the circulated packet signals resulting, in SOA 234-1, in a modulated clock signal (herein designated $\lambda_{2\text{-}XGM}$ and, in SOA 234-2, in a phase shifted modulated clock signal (herein designated $\lambda_{2\text{-}XGM\text{-}PS}$). It should be appreciated that each XGM clock $\lambda_{2\text{-}XGM}$ and $\lambda_{2\text{-}XGM\text{-}PS}$ may essentially be a partially reshaped circulated data packet. In the counter-propagating direction, data packets may be modulated via XGM and XPM with the clock signals resulting in $\lambda_{2\text{-}XGM}$ and $\lambda_{2\text{-}XGM\text{-}PS}$. The counter-propagating modulated data packets $\lambda_{2\text{-}XGM}$ and $\lambda_{2\text{-}XGM\text{-}PS}$ may be directed by circulators 232 into terminators 235.

The packet reshaping and regeneration process may thus enable several circulations of the packet through FDL 247, with the packet being effectively regenerated on each circulation.

As with the first circulation (FIG. 2C), the modulated clock signals $\lambda_{2\text{-}XGM}$ and $\lambda_{2\text{-}XGM\text{-}PS}$ may be combined in coupler 244 to form a regenerated output packet, herein designated $\lambda_{2\text{-}S1}$. Coupler 244 may introduce a further phase shift of $\pi/2$ into $\lambda_{2\text{-}XGM\text{-}PS}$ for a complete phase shift of R in order to provide the required logical AND at the output (coupler 244) of MZI 245. The regenerated output packet $\lambda_{2\text{-}S1}$ of coupler 244 may be directed by splitter 246 to SOA 252 and FDL 247. When scheduler 216 determines that output packet $\lambda_{2\text{-}S1}$ has completed a required buffering period, scheduler 216 may power on SOA 252 to thereby "release" packet $\lambda_{2\text{-}S1}$ to one of output ports 214 as described above.

As determined by scheduler 216, packet $\lambda_{2\text{-}S1}$ may traverse FDL 247 for a second circulation until SOA 248. SOA 248 may amplify the signal after FDL 247 to compensate for signal losses incurred in FDL 247. The amplified signal may further be passed through DM 250 to compensate for dispersion introduced by FDL 247. The output signal from DM 250, herein designated $\lambda_{2\text{-}S1\text{-}REGEN}$ may be reintroduced into MZI 245 at coupler 238 for regeneration and release (through SOA 252) or further circulations.

Figure 3A:
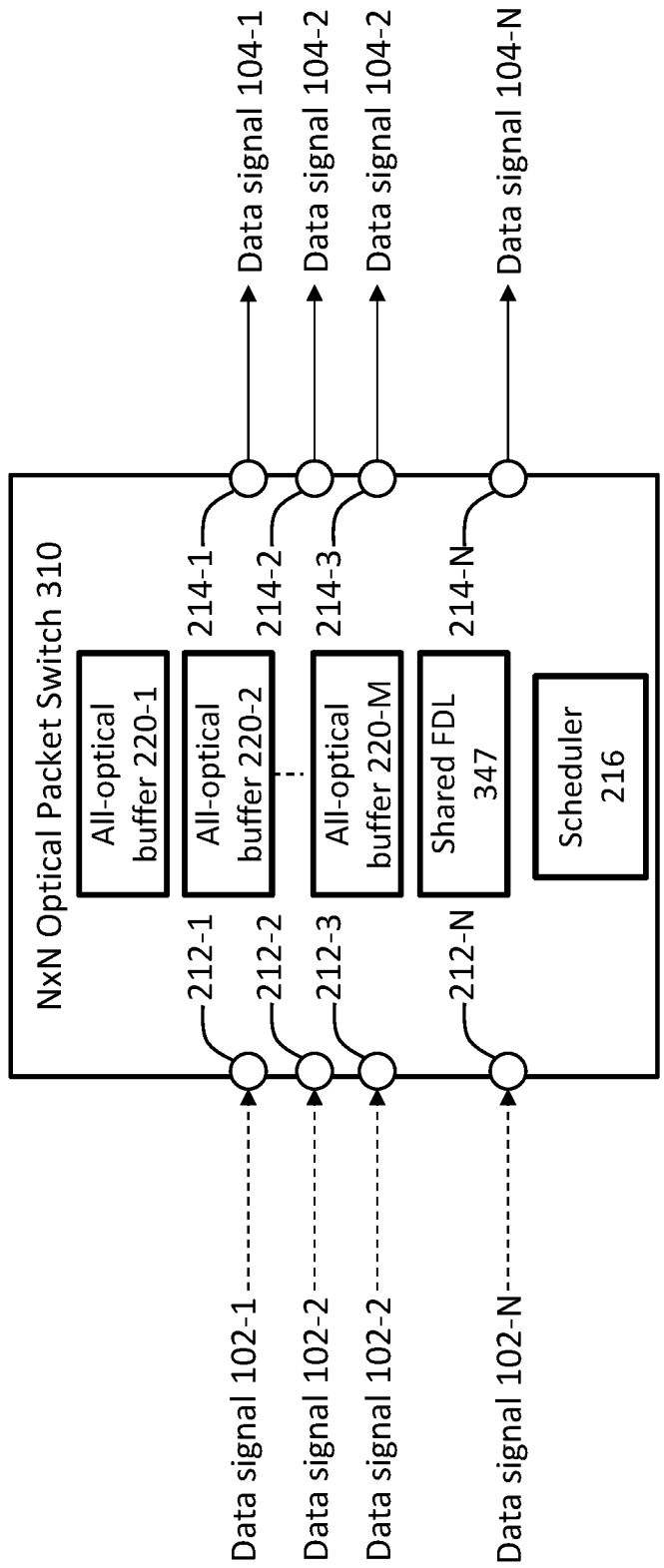
FIGS. 3A-3C show block diagrams of an optical packet switch according to some embodiments.
Figure 3B:
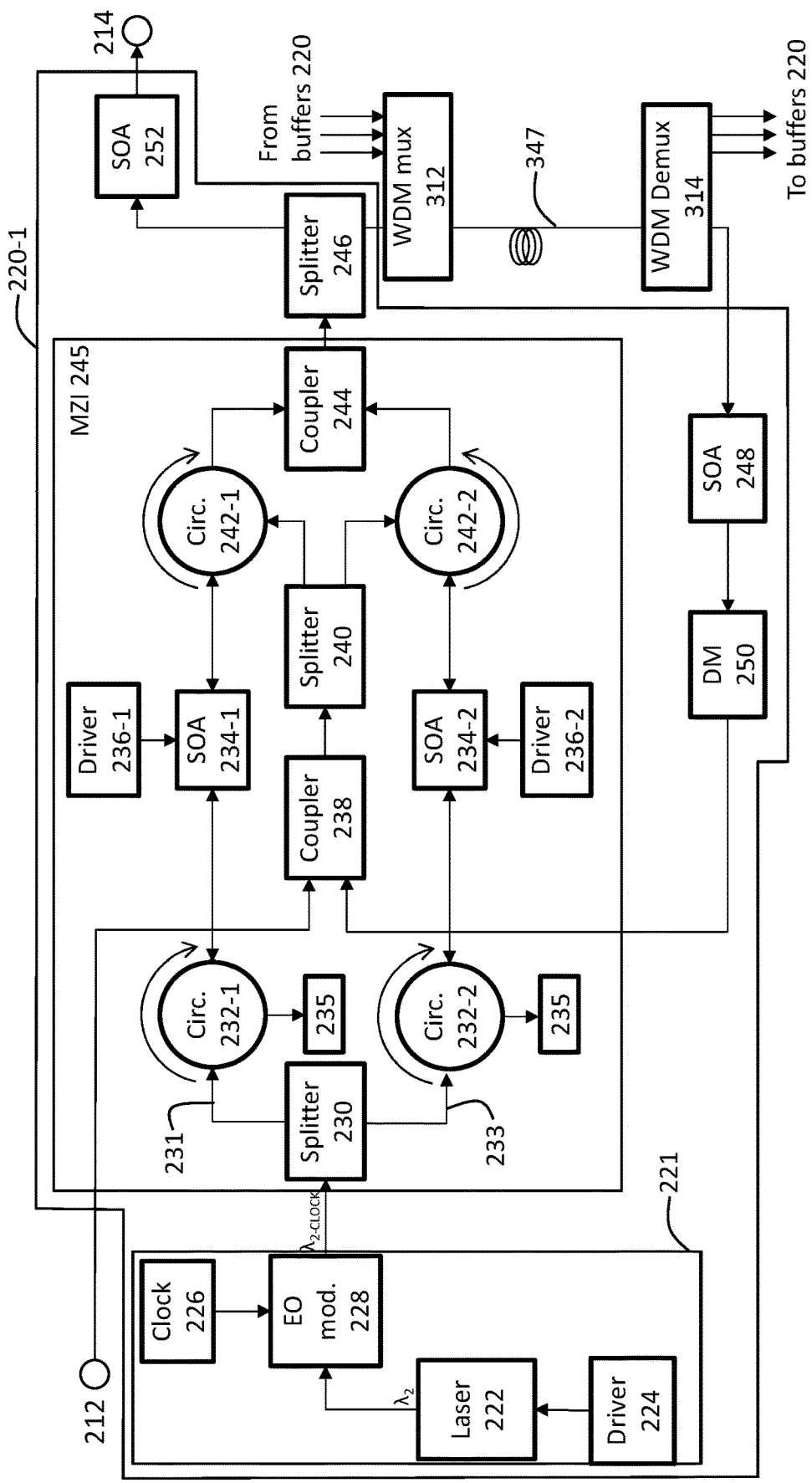
Figure 3C:
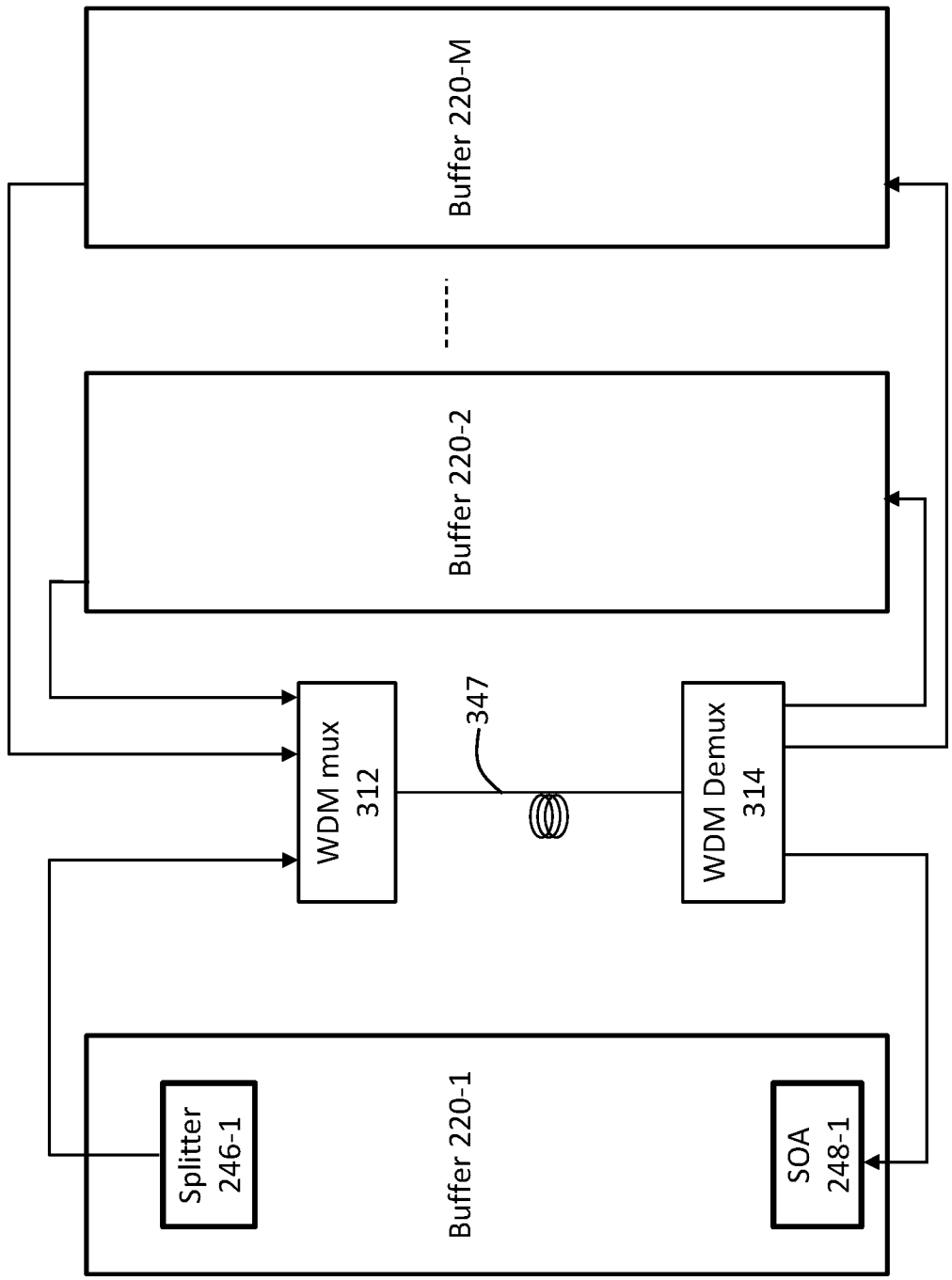

FIGS. 3A-3C show an all-optical packet switch according to some embodiments. As shown in FIG. 3A, a N×N optical packet switch 310 is the same as packet switch 210 described above, but additionally may include multiple all-optical buffers 220-1, 220-2 ... 220-M and a shared FDL 347.

In some embodiments, shared FDL 347 may use a single core fiber optic cable. In some embodiments, shared FDL 347 may make use of multi-core fiber optic cable. In some embodiments, up to 64 wavelengths may be transmitted per fiber optic core in shared FDL 347.

As shown in FIGS. 3B and 3C, shared FDL 347 may be shared by multiple optical buffers 220 using wavelength division multiplexing (WDM). A WDM multiplexer (mux) 312 may receive a signal from splitter 246-1 of buffer 220-1 and may combines the received signal with signals received from splitters 246 of other buffers 220 for transmission over shared FDL 347.

Following transmission through shared FDL 347, a WDM demultiplexer (demux) 314 may split the multiplexed signals for transmission to SOA 248 of each of buffers 220.

In the claims or specification of the present application, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

Although the present disclosure is described with regard to a computing device, or a computer, it should be noted that optionally any device featuring a data processor and the ability to execute one or more instructions may be described as a computing device, including but not limited to any type of personal computer (PC), a server, a distributed server, a master control unit, a virtual server, a cloud computing platform, a cellular telephone, an IP telephone, a smartphone, a smart watch or a PDA (personal digital assistant). Any two or more of such devices in communication with each other may optionally form a "network" or a "computer network".

It should be understood that where the claims or specification refer to "a" or "an" element, such reference is not to be construed as there being only one of that element. In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure describes a limited number of embodiments, it will be appreciated that many variations, modifications, and other applications of such embodiments may be made. The disclosure is to be understood as not limited by the specific embodiments described herein, but only by the scope of the appended claims.

What is claimed is:

1. An optical switch comprising:
 a scheduler; and
 a buffer for buffering an optical packet including, arranged in a circuit, a clock generator for generating a clock signal, an optical unbalanced Mach Zehnder Interferometer (MZI) and a fiber delay line (FDL) having an FDL length,
 wherein the optical packet has an optical packet signal,
 wherein the scheduler is configured to insert the optical packet into the buffer and to determine a number of circulations of the optical packet through the circuit,
 wherein the MZI modulates the clock signal based on the optical packet signal to create a reshaped optical packet after each circulation of the optical packet through the circuit, and
 wherein the FDL introduces a delay in the optical packet proportional to the FDL length.

2. The switch of claim 1, wherein the circuit further comprises a circuit semiconductor optical amplifier (SOA) to compensate for losses introduced in the FDL.

3. The switch of claim 1, wherein the circuit further comprises an optical dispersion management (DM) module to compensate for dispersion introduced in the FDL.

4. The switch of claim 1, wherein the clock generator includes a tunable laser and an electro-optical (EO) modulator configured for modulating a laser output of the tunable laser based on the clock signal.

5. The switch of claim 1, further comprising a WDM multiplexer and WDM demultiplexer for sharing the FDL therewith between multiple buffers.

6. The switch of claim 1, wherein the FDL is one of a single core fiber optic cable or a multi-core fiber optic cable.

7. The switch of claim 1, wherein the reshaped optical packet is a wavelength converted optical packet.

8. The switch of claim 1, wherein the MZI includes a pair of MZI SOAs.

9. The switch of claim 8, wherein the MZI SOAs are quantum dot SOAs.

10. The switch of claim 8, wherein the buffer further includes an optical packet splitter for directing the optical packet through the pair of the MZI SOAs, wherein the optical packet splitter splits a signal strength unequally between the pair of MZI SOAs.

11. The switch of claim 8, wherein the clock and optical packet are fed into each of the pair of MZI SOAs in counter-propagating directions for causing cross gain modulation (XGM) and cross phase modulation (XPM) of the clock signal and of the optical packet signal.

12. The switch of claim 1, further comprising an exit SOA at an exit of the buffer, wherein the scheduler is further configured to activate the exit SOA to release the optical packet from the buffer.

13. The switch of claim 12, wherein the clock generator includes a tunable laser, and wherein the scheduler is further configured for powering down the exit SOA and the tunable laser following release of the optical packet to thereby empty the buffer.

14. The switch of claim 12, wherein the scheduler is further configured to time the activation of the exit SOA such that it coincides with an nT time period, where n is an integer and T is a optical packet circulation time through the buffer, such that the optical packet is released through the exit SOA from a beginning to an end of the buffered optical packet, and such that release of a partial optical packet through the exit SOA is prevented.

15. The switch of claim 12, wherein the released optical packet is a wavelength converted optical packet.

16. A method for optical buffering of an optical packet having an optical packet signal comprising:
 providing an optical switch including a scheduler and a buffer, wherein the buffer includes a clock generator for generating a clock signal, an optical unbalanced Mach Zehnder Interferometer (MZI) and a fiber delay line (FDL) having an FDL length, arranged in a circuit;
 configuring the scheduler to insert a optical packet into the buffer and to determine a number of circulations of the optical packet through the circuit;
 using the MZI to modulate the clock signal based on the optical packet signal to create a reshaped optical packet after each circulation of the optical packet through the circuit; and
 using the FDL to introduce a delay in the optical packet proportional to the FDL length.

17. The method of claim 16, wherein the circuit further comprises a circuit semiconductor optical amplifier (SOA) to compensate for losses introduced in the FDL.

18. The method of claim 16, wherein the circuit further comprises an optical dispersion management (DM) module to compensate for dispersion introduced in the FDL.

19. The method of claim 16, wherein the clock generator includes a tunable laser and an electro-optical (EO) modulator configured for modulating the laser output of the tunable laser based on the clock signal.

20. The method of claim 16, further comprising providing a WDM multiplexer and WDM demultiplexer for sharing the FDL therewith between multiple buffers.

21. The method of claim 16, wherein the FDL is one of a single core fiber optic cable or a multi-core fiber optic cable.

22. The method of claim 16, wherein the reshaped optical packet is a wavelength converted optical packet.

23. The method of claim 16, wherein the MZI includes a pair of MZI SOAs.

24. The method of claim 23, wherein the MZI SOAs are quantum dot SOAs.

25. The method of claim 23, wherein the buffer further includes a optical packet splitter for directing the optical packet through the pair of MZI SOAs, wherein the optical packet splitter splits a signal strength unequally between the pair of MZI SOAs.

26. The method of claim 23, wherein the clock and optical packet are fed into each of the pair of MZI SOAs in counter-propagating directions for causing cross gain modulation (XGM) and cross phase modulation (XPM) of the clock signal and of the optical packet signal.

27. The method of claim 16, wherein the optical switch includes an exit SOA at an exit of the buffer, and wherein the scheduler is further configured to activate the exit SOA to release the optical packet from the buffer.

28. The method of claim 27, wherein the clock generator includes a tunable laser, and wherein the scheduler is further configured for powering down the exit SOA and the tunable laser following release of the optical packet to thereby empty the buffer.

29. The method of claim 27, wherein the scheduler is further configured to time the activation of the exit SOA such that it coincides with an nT time period, where n is an integer and T is a optical packet circulation time through the buffer, such that the optical packet is released through the exit SOA from a beginning to an end of the optical packet, and such that release of a partial optical packet through the exit SOA is prevented.

30. The method of claim 27, wherein the released optical packet is a wavelength converted optical packet.

* * * * *